United States Patent Office 3,065,236
Patented Nov. 20, 1962

3,065,236
METHOD FOR THE PREPARATION OF ALKYL BORATE-AMINE COMPOUNDS
David Matheson Young and Charlotte Doreen Anderson, Sarnia, Ontario, Canada, assignors to The Dow Chemical Company, Midland, Mich., a corporation of Delaware
No Drawing. Filed Mar. 25, 1960, Ser. No. 17,486
Claims priority, application Canada July 27, 1959
7 Claims. (Cl. 260—293)

This invention relates to an improved method for the preparation of alkyl borate-amine compounds.

The term "alkyl borate-amine compounds" is used to identify a series of compounds which are adducts of an alkyl borate and each of a series of monofunctional non-aromatic amines; in addition, the adduct of an alkyl borate and ammonia is considered to be an "alkyl borate-amine compound."

A process for making methyl borate-ammonia is described by Schechter in U.S. Patent No. 2,629,732. The Schechter patent teaches the preparation of methyl borate-ammonia by (1) reacting liquid methyl borate with dry gaseous ammonia; (2) reacting methyl borate vapor with dry gaseous ammonia; and (3) reacting a mixture of methyl borate and methanol with dry gaseous ammonia. In attempting to carry out the procedure as described in (1), the inventors experienced great difficulty because the entire mass solidified in the reactor. Also, it was certain that it would be extremely difficult to effect complete contact between the two reactants because the mass became too viscous to stir. The method as taught in (2), when applied on a plant production scale would require very large equipment because the reaction requires an inert carrier gas to convey the methyl borate vapor. In addition, since the reaction is carried out at room temperature or below, the production rate of such a plant is severely limited by the low vapor pressure of methyl borate, which is only 37 millimeters of mercury at 0° C. On the same basis, the method as taught in (2) is impractical for relatively non-volatile amines. Furthermore, the finely divided solid product would have to be collected from a gas stream.

The method as taught in (3) yields a product into which substantial amounts of methanol are incorporated, the removal of which is accomplished only after prolonged drying under vacuum.

The employment of a solvent, such as diethyl ether, for the reaction of methyl borate and amines has been attempted by previous workers in the art. It was found, however, that many solvents were incorporated into the methyl borate-amine crystals. Attempts to remove the incorporated solvent by the use of reduced pressure or by other ordinarily suitable means resulted in substantial dissociation of the methyl borate-amine into its components.

We have now discovered, however, an inmproved method for preparing alkyl borate-amine compounds. This improved method suffers from none of the shortcomings of the methods of the prior art, is simple to carry out, and is readily adaptable to continuous, plant-scale operation, and results in a product free of incorporated solvent.

The solvent employed in the improved method of the present invention is a member of the class of alkane hydrocarbons containing from 4 to 8 carbon atoms, except those containing a neocarbon atom; the solvent may be a pure compound or may be a mixture of two or more compounds chosen from the class of hydrocarbons specified above; for example, a petroleum fraction consisting of components falling within the limits described is operable. By the term "neocarbon atom" is meant a carbon atom which is attached to four other carbon atoms, such as, for example, in neopentane and isooctane.

In the improved method of the present invention, an alkyl borate having the formula:

wherein R is an alkyl radical of from 1 to 8 carbon atoms, is dissolved in the alkane hydrocarbon and the solution is contacted with a member selected from the group consisting of ammonia and all monofunctional non-aromatic amines having from 1 to 12 carbon atoms. The term "monofunctional amines" is meant to include all amines having one or more amino groups as its only functional groups. The contacting of the alkyl borate solution with the amine is done at atmospheric or superatmospheric pressure, depending upon the desired physical state of the amine or ammonia used as a reactant; for example, liquid ammonia at −28° C. and atmospheric pressure is operable, as is gaseous ammonia at atmospheric or superatmospheric pressure. The alkyl borate-amine thus formed precipitates in the solvent medium and is removed from the solvent, as by filtration; this precipitate can then be washed one or more times with additional solvent and dried. Preferred drying procedures include drying for a few minutes at about room temperature in an atmosphere of dry air or dry nitrogen, so as to prevent dissociation of the product by continued exposure to air and possible reaction of the product with water.

The alkane solvent remaining as the filtrate from the previous separation step is then conveniently recontacted with additional alkyl borate, as by recycling the solvent, the alkyl borate dissolved in the solvent, and the reaction cycle repeated.

Preferable operating temperature for the process is about room temperature, although lower temperatures may be used if desired. The use of elevated temperatures should be avoided to prevent substantial dissociation of the reaction product.

The desirable molar ratio of the reactants, alkyl borate to amine or ammonia, is from 1:10 to 10:1, preferably about 1:1.

The following examples illustrate the present invention, but are not to be construed as limiting the invention thereto:

Example I

One hundred four (104) grams (1.0 mole) of methyl borate were dissolved in 495 grams of n-hexane and this solution was saturated with dry ammonia gas at 25° C. and atmospheric pressure. The white crystalline precipitate was filtered, washed several times with n-hexane and dried with suction in an atmosphere of dry nitrogen. There were recovered 70 grams of product, representing 58 percent of the theoretical yield based on methyl borate. Upon analysis, the product was found to contain 10.46 percent nitrogen and 9.10 percent boron, compared with theoretical values of 11.59 percent and 8.95 percent, respectively.

An additional 170 grams of methyl borate were added to the filtrate and washings from the above preparation. The solution was then saturated with ammonia at 0° C. and the product filtered, washed, and dried as before. The yield of methyl borate-ammonia, based on the 170 grams of methyl borate-ammonia crystals revealed 10.81 percent nitrogen and 9.38 percent boron.

Example II

To 104 grams (1.0 mole) of methyl borate dissolved in 300 grams of isopentane were added, with shaking, 85 grams (5.0 mole) of liquid ammonia suspended in 300 grams of isopentane, both solutions having been cooled previously to −28° C. The mixture was allowed to warm to room temperature and the fine white crystals were filtered and dried. A quantitative yield was obtained, as evidenced by the virtual absence of methyl borate in the isopentane filtrate. Analysis of the methyl borate-ammonia crystals revealed 10.37 per cent nitrogen and 9.48 percent boron.

Compounds which have been made by the improved method of the present invention include methyl borate-ammonia, methyl borate-methylamine, methyl borate-diethylamine, methyl borate-tertiary-butylamine, and methyl borate-piperidine. It is to be understood that other aliphatic and heterocyclic monofunctional amines having from 1 to 12 carbon atoms are operable, such as for example, n-amylamine, 3-methyl-amylamine, n-hexylamine, 3,5-dimethyl-hexylamine, n-octylamine, n-decylamine, diethylamine, diethylenetriamine, 1,5-pentanediamine, propazane, butazane, pentazane, octazane, and that analogous alkyl borate-amine compounds can be made therefrom. Similarly, it is to be understood that all monofunctional non-aromatic amines having from 1 to 12 carbon atoms, in addition to the aliphatic and heterocyclic genera described above, are operable and within the scope of the present invention.

We claim:

1. In a method for making alkyl borate-amine compounds wherein an alkyl borate having the formula:

where R is an alkyl radical of from 1 to 8 carbon atoms, is contacted with a monofunctional non-aromatic amine having from 1 to 12 carbon atoms at a temperature below the dissociation temperature of the alkyl borate-amine compound and the thus-formed alkyl borate-amine compound is separated from the reaction mixture, the improvement which comprises contacting said borate with said amine in a solvent medium wherein said solvent is a non-neocarbon-containing alkane having from 4 to 8 carbon atoms.

2. The method as in claim 1 wherein the amine is a member selected from the group consisting of aliphatic amines and heterocyclic amines.

3. The method as in claim 1 where the amine is ammonia.

4. The method as in claim 1 where the amine is methylamine.

5. The method as in claim 1 where the amine is diethylamine.

6. The method as in claim 1 where the amine is tertiarybutylamine.

7. The method as in claim 1 where the amine is piperidine.

References Cited in the file of this patent

UNITED STATES PATENTS 2,629,732     Schechter _____ Feb. 24, 1953

OTHER REFERENCES

Goubeau et al.: Zeitschrift für Anorganische und Allgemeine Chemie, vol. 266, pp. 161–174 (1951).

Goubeau et al.: Zeitschrift für Anorganische und Allgemeine Chemie, vol. 267, pages 27–36 (1952).

Colclough et al.: Journal of the Chemical Society (London), 1956, pages 3006–3007.